OR    4,000,937

United States Patent
Kaminow

[11]  4,000,937
[45]  Jan. 4, 1977

[54] PLANAR WAVEGUIDE ELECTROOPTIC PRISM DEFLECTOR

[75] Inventor: Ivan Paul Kaminow, New Shrewsbury, N.J.

[73] Assignee: Bell Telephone Laboratories, Inc., Murray Hill, N.J.

[22] Filed: June 5, 1975

[21] Appl. No.: 583,895

[52] U.S. Cl. .................... 350/96 WG; 350/96 C; 350/160 R
[51] Int. Cl.[2] .......................................... G02B 5/14
[58] Field of Search ........ 350/96 WG, 160 R, 96 C

[56] References Cited
UNITED STATES PATENTS

| | | | |
|---|---|---|---|
| 3,695,745 | 10/1972 | Furukawa | 350/96 WG |
| 3,700,912 | 10/1972 | Glass et al. | 307/88.3 |
| 3,870,397 | 3/1975 | Dillon, Jr. et al. | 350/96 WG |
| 3,874,782 | 4/1975 | Schmidt | 350/96 WG |
| 3,877,781 | 4/1975 | Kaminow | 350/96 WG |
| 3,909,108 | 9/1975 | Taylor | 350/96 WG |

OTHER PUBLICATIONS

Ash et al, IBM Technical Dis. Bulletin vol. 14, No. 3 Aug, 1971, "Switchable Optical Waveguide" pp. 999–1000.
Schmidt et al, "Metal–diffused Optical Waveguides in LiNbO$_3$" Applied Physics Letters vol. 25, Oct. 15, 1974 pp. 458–460.
Tien et al., "Light–beam Scanning and Deflection in Epitaxial LiNbO$_3$ Electro–optic", App. Phys. Letters vol. 25, Nov. 15, 1974 pp. 563–565.

*Primary Examiner*—John K. Corbin
*Assistant Examiner*—Stewart Levy
*Attorney, Agent, or Firm*—Wilford L. Wisner; James F. Hollander

[57]  ABSTRACT

Electrooptic prism-type deflection is provided in a planar waveguide thin film of electrooptic material, such as a thin titanium-diffused region in a lithium niobate crystal, by means of an electrode arrangement involving three thin metallic stripes as the only needed electrodes. All three stripes are disposed on top of the thin film of light-guiding electrooptic material, the outermost two being essentially parallel to the incoming light beam path, and the third extending diagonally between opposite ends of, but not contacting, the others. The electrooptic material is oriented to have its crystallographic C-axis, along which it exhibits a linear electrooptic effect, parallel to the interface of the light-guiding film and the lower index substrate and othogonal to the initial propagation direction of the light beam. Like deflection voltages are applied to the two triangular electrooptic waveguide portions defined by the stripes. It has been found that the device can operate as a bipolar switch for electrode voltages as small as ±15 volts.

10 Claims, 4 Drawing Figures

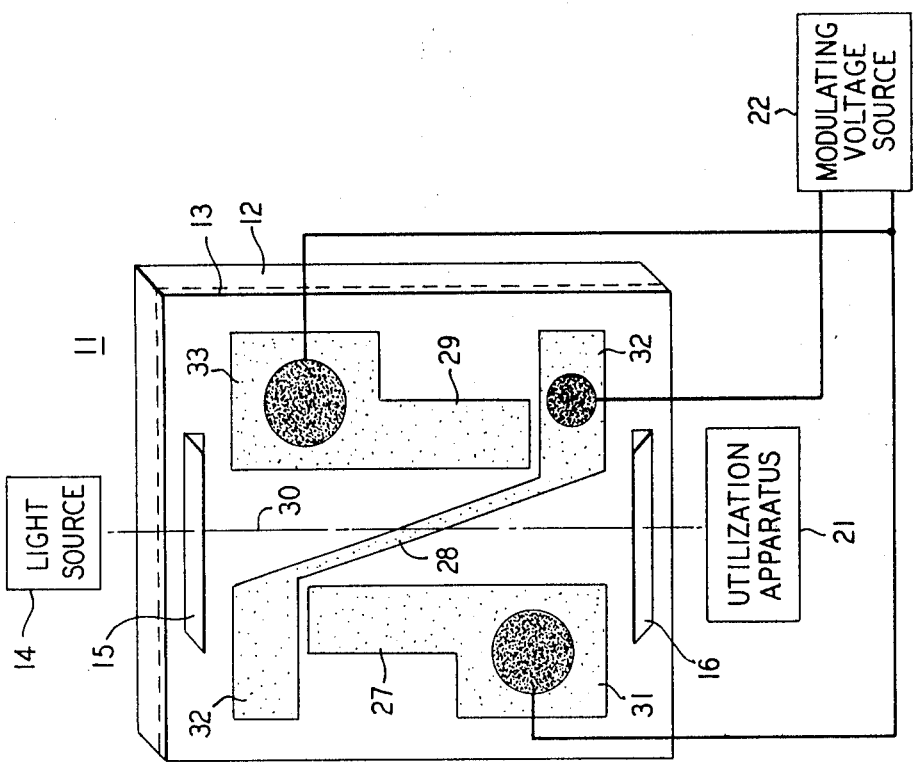
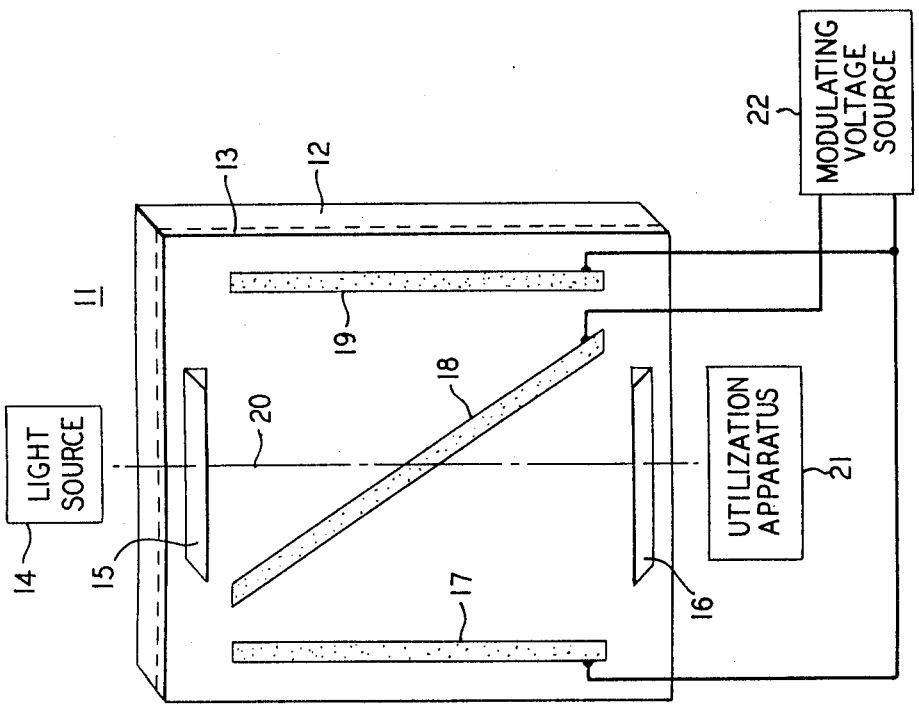

PLANAR WAVEGUIDE ELECTROOPTIC PRISM DEFLECTOR

BACKGROUND OF THE INVENTION

This invention relates to electrooptic deflectors of the type which are usable with so-called planar optical waveguides.

In many applications of both coherent and incoherent light for industrial, communication or data processing purposes, it is desired to deflect a light beam as efficiently and with as high a resolution as possible. Initially, proposals for such light beam deflectors employed active devices of a bulk nature, such as three-dimensional electrooptic crystal deflectors.

With the advent of waveguiding optics, including planar or thin-film optics, subsequent proposals were made for deflecting light beams in such media; and it was found that generally they were more effective and efficient than the prior bulk deflectors. Nevertheless, the electrodes utilized with waveguiding devices are unnecessarily inefficient and cumbersome to make. In addition, I have found that the finished device is not as simple as it might be.

SUMMARY OF THE INVENTION

I have discovered a thin-film waveguiding electrooptic light deflector of the prism type of surprising simplicity and which has minimum drawbacks for insertion in an integrated optical circuit of the thin-film type. It employs only three thin metallic stripes as the electrodes. They are disposed on top of a thin film of electrooptic light-guiding material, the outermost two being essentially parallel to the incoming light beam path, and the third extending diagonally between opposite ends of, but not contacting, the others.

According to one feature of my invention, the electrooptic thin-film material exhibits a linear electrooptic effect along a particular crystallographic axis; and the film is oriented to have that axis parallel to the interface of the light-guiding film with the substrate and orthogonal to the initial direction of light beam propagation. Like deflection voltages are applied to the two triangular electrooptic waveguide portions defined by the three stripes in relative polarities to produce additive electrooptic deflection effects.

According to a subsidiary feature of my invention, the light-guiding electrooptic thin film is formed by indiffusion of an appropriate metal, such as titanium, into the single crystal lithium niobate ($LiNbO_3$) to differentiate the light-guiding region from the remaining lower index substrate. The deflection of the light beam is then minimally affected by the properties of the interface.

According to still another subsidiary feature of my invention, contact is made to the three metallic electrode stripes for purposes of applying the signal voltage by depositing relatively large metallic regions on the thin film connected to respective ones of the stripes but substantially removed from proximity to the path of the light beam propagation.

Advantageously, I consider that the deflection characteristic of my new electrooptic deflector is superior to those of many prior art thin film deflectors.

BRIEF DESCRIPTION OF THE DRAWING

Further features and advantages of my invention will become apparent from the following detailed description, taken together with the drawing, in which:

FIG. 1 is a partially pictorial and partially block diagrammatic illustration of a simple embodiment of my invention;

FIG. 2 is a partially pictorial and partially block diagrammatic showing of a modification of the embodiment of FIG. 1 providing practical electrode contact areas for connection to external circuits;

DESCRIPTION OF ILLUSTRATIVE EMBODIMENTS

Figure 4:
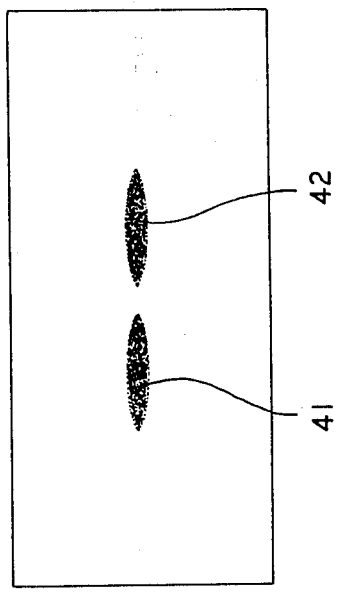
FIG. 4 shows two resolvable spots obtained as an output from a particular operation of the embodiment of FIG. 2.

In the embodiment of FIG. 1, the thin-film electrooptically controlled prism deflector 11 is intended to serve as a multiport switch, the simplest example of which is a bipolar switch, or to serve as an optical shutter for the utilization apparatus 21. The device 11 is intended to be a simple structure, easy to fabricate and highly effective and efficient.

In my experimental work I have found that a $LiNbO_3$ dielectric substrate 12 was advantageous. A light-guiding layer 13 adapted to be low-loss for the wavelength of light from light source 14 is formed to some depth into the top surface of substrate 12 by diffusion of titanium, which is preferred, or diffusion of another appropriate metal, such as another transition metal, into the $LiNbO_3$ in order to increase its optical index of refraction.

The substrate 12 and consequently also the continued single crystal in which layer 13 is formed is oriented to place the crystalline C-axis, along which $LiNbO_3$ exhibits a linear electrooptical effect, in the plane of the interface of substrate 12 and light-guiding layer 13 and orthogonal to the initial direction or center line 20 of the light beam in layer 13. The deflection electrodes 17, 18 and 19 are disposed about the center line 20 of the light beam in the novel pattern characteristic of my invention. This pattern is vaguely reminiscent of the letter N. In fact, the electrodes 17 and 19 are narrow metallic stripes illustratively of aluminum which were evaporated through a photolithographic mask to be parallel to center line 20 and to lie beyond the edges of the expected light beam in waveguide 13. The electrode 18 is similarly deposited so that it is diagonally extended between opposite ends of electrode stripes 17 and 19, but not quite touching them, and extends equal distances on either side of center line 20. A typical spacing between electrodes 17 and 19 is about 100 $\mu$m and the length of the optical path through the twin prism deflector thus formed along center line 20 is about 6 mm. The spacing between the near ends of electrodes 17, 18 and 19 respectively is about 10 $\mu$m.

Light was coupled in to waveguide 13 from a source 14 which was illustratively a beam from a helium neon laser operating at 0.6328 $\mu$m, focused by a 14 cm lens. The beam was coupled in to the waveguide 13 by the prism-film coupling technique by means of use of a rutile ($TiO_2$) prism 15. The appropriate use of such prisms for input and output coupling is described in U.S. Pat. No. 3,584,230 issued June 8, 1971 to P. K.

Tien. The output coupling from waveguide 13 to utilization apparatus 21 is likewise achieved by a similar rutile prism 16. An illustrative beam diameter for the apparatus of FIG. 1 would be about 66 μm.

Before proceeding to a description of the actual working embodiment of FIG. 2, one can achieve an intuitive insight into the operation of the invention by considering that the linear electrooptic effect in LiNbO$_3$ has the following properties. Assume, as shown, that a modulating voltage source 22 with an output voltage of V volts has one terminal connected to the center electrode 18 and the other terminal connected to both outside electrodes 17 and 19. The fields created by these symmetrically applied voltages extend primarily horizontally through waveguide 13 in a direction orthogonal to center line 20 but are opposite in polarity. These fields are directed along the crystalline C-axis of the LiNbO$_3$, as is required for the linear electrooptic effect. One of these fields tends to compress the crystalline lattice along the C-axis; and the other field, because of its opposite polarity tends to stretch the crystalline lattice along the same axis. Assume that the former case applies between electrodes 18 and 19 and that the latter applies between electrodes 17 and 18. The light wave will be slowed down in passage between electrodes 18 and 19 but will be speeded up in its passage between electrodes 17 and 18. Therefore, the beam will tend to be bent in the plane of the waveguide 13 toward the side along which electrode 19 lies.

Advantageously for the structure of FIG. 1, this effect is accentuated even more than in most bulk electrooptic deflectors, first, because of the concentration of the light in waveguide 13, and, second, because of the nonuniformity of the electric fields extending between the electrodes. In other words, the field between electrodes 18 and 19 will be far stronger where these are closest together than where they are farthest apart and the same is true between electrodes 17 and 18. Even though the light beam has a relatively short path through the higher field areas near the "apex" of each prism area, the net effect in both prism areas is to increase the deflection of the beam toward the side on which electrode 19 lies.

A more complete description and understanding of my invention may be obtained by considering the actual working embodiment of FIG. 2. In this embodiment the utilization apparatus 21 was a photographic apparatus adapted to measure the resolvability of the output spots obtained, with a view to insuring performance of the device for optical shuttering effects or as a bipolar switch. The embodiment of FIG. 2 retains all the properties set out above with the embodiment of FIG. 1 and has additional characteristics that the electrodes which are now designated as 27, 28 and 29 in correspondence to electrodes 17, 18 and 19 of FIG. 1 are provided with widened contact areas 31, 32 and 33 in regions where they will not appreciably perturb propagation of the light beam. These contacts 31 through 33 facilitate connection of external wires to the electrodes so that they may be connected to the terminals of the modulating voltage source such as source 22.

Further details for the embodiment of FIG. 2 are as follows. The beam from source 14 was supplied with an estimated width diameter of 66 μm in essentially a Gaussian mode. The waveguide 13 was formed by diffusing titanium into the LiNbO$_3$ as disclosed in the article by myself and R. V. Schmidt, "Metal-Diffused Optical Waveguides in LiNbO$_3$," *Applied Physics Letters*, Volume 25, page 458 (1974). The waveguide 13 was approximately 1 μm thick.

The experimental aluminum electrode pattern shown in FIG. 2 was evaporated through a photolithographic mask on to the titanium-diffused waveguide 13 so that, as mentioned in part above, the spacing between electrodes 27 and 29 was about $A = 100$ μm, the length of those electrodes was $B = 6$ mm, the closest approach of electrodes 27 and 28 and also of electrodes 28 and 29 was about $y_o = 10$ μm. The width of the diagonal electrode 28 was illustratively 5 μm. The mathematics which follows assumes that this width is, in any case, much smaller than the separation A between the outer electrodes. In that event, the width of electrode 28 is not used in the mathematics. The extraordinary refractive index $n_e$ is about 2.2 and the appropriate electrooptic coefficient of the waveguide 13 $r_{33}$ is $3\times10^{-11}$ meters per volt.

Figure 3:
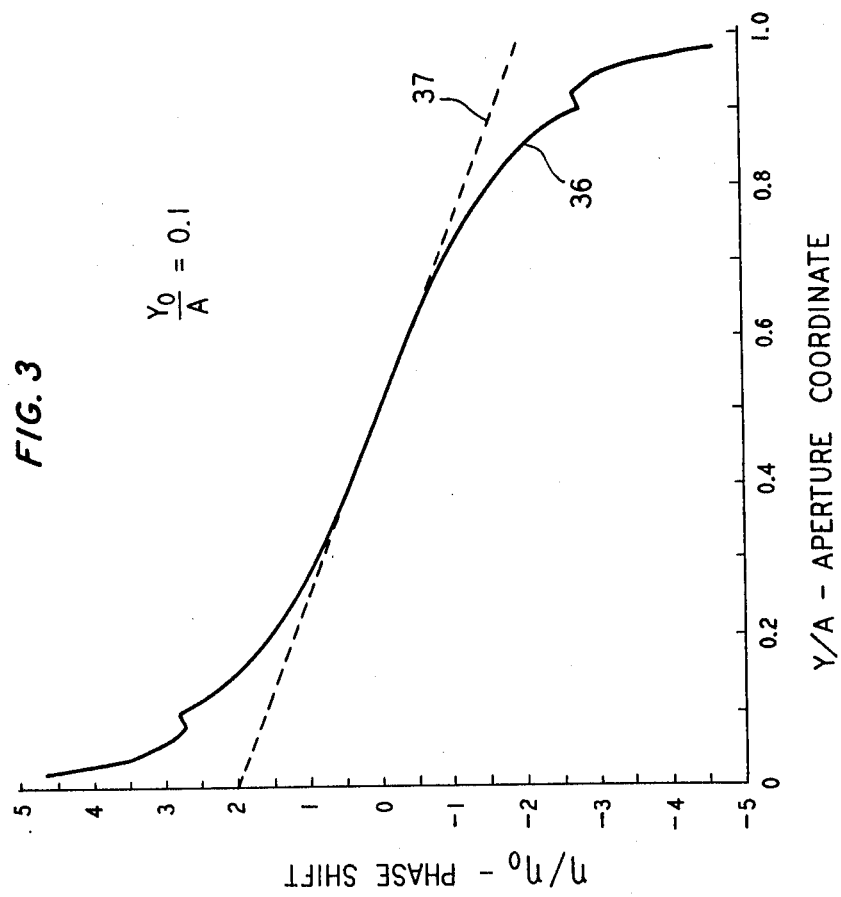
FIG. 3 shows curves useful in explaining the theory and operation of the embodiment of FIGS. 1 and 2.

With these conditions provided, the operation of the embodiment of FIG. 2 produced the two resolvable spots 41 and 42 shown in FIG. 4 for applied voltages of ±15 volts from source 22. That is, the terminal of source 22 was 15 volts and it was connected as shown to the contacts 31, 32 and 33. The curve 36 of FIG. 3 shows the theoretical phase shift, $n/n_o$ for the device of FIG. 2, shown on the vertical axis, versus $y/A$, the aperture coordinate along the horizontal axis. This curve is obtained from the mathematics which follows. First, however, one may observe that the curve for $y_o/A = 0.1$, generally has a steeper slope than the linear approximation, which is shown by dashed curve 37.

For the above assumed conditions and values of parameters, the distance from the electrode 17 to electrode 18 is $$d = y_o + az, \quad (1)$$

where $a$ is the slope. The thickness of the planar waveguide 13 is assumed to be much less than the spacing A. Hence, the field $E_y(y,z)$ just below the surface of the waveguide 13 is $$E_y(y, z) = \begin{cases} -\dfrac{V}{\pi}[y(d-y)]^{-1/2}, & 0<y<d \\ +\dfrac{V}{\pi}[(A-y)(y-d)]^{-1/2}, & d<y<A. \end{cases} \quad (2)$$

The electrooptically induced phase shift $\eta(y)$ for light polarized in the y-direction and traveling along z at a given value of y is $$\eta(y) = -\frac{\pi n_e^3 r_{33}}{\lambda} \int_0^B E_y(y, z) dz$$

$$= \eta_o \begin{cases} \left(\dfrac{A-y_o-y}{y}\right)^{1/2} - \left(\dfrac{y_o-y}{y}\right)^{1/2}, & 0<y<y_o \\ \left(\dfrac{A-y_o-y}{y}\right)^{1/2} - \left(\dfrac{y-y_o}{A-y}\right)^{1/2}, & y_o<y<A-y_o \quad (3) \\ \left(\dfrac{y_o+y-A}{A-y}\right)^{1/2} - \left(\dfrac{y-y_o}{A-y}\right)^{1/2}, & A-y_o<y<A \end{cases}$$

with $$\eta_o = \frac{2n_e^3 r_{33} V_o}{\lambda a}. \quad (4)$$

$n_e$ the extraordinary refractive index and $r_{33}$ the appropriate electrooptic coefficient. In the approximation, $$y \approx A/2, \ y_o \ll A, \ a = A/B,$$

the prism-like linear phase shift becomes $$\eta(y) \approx 2\eta_o(1 - 2y/A). \quad 5.$$

This linear approximation is compared with the function (3) in FIG. 3 for $y_o/A = 0.1$. It can be seen that the approximation is satisfactory over about 70 percent of the aperture A.

The linear phase shift across the aperture causes the wavefronts to be rotated through a scan angle $\theta$ given by $$\tan\theta = \frac{\lambda \eta(0)}{\pi n_e A}$$
$$= \frac{4 n_e^2 r_{33} B V_o}{\pi A^2}. \quad (6)$$

For a Gaussian beam having a diameter D at its waist, which is at the center of the prism, the beam angle between $1/e^2$ points is $$\phi = \frac{4\lambda}{\pi n_e D} \quad (7)$$

and the number N of resolvable spots is, for small $\theta$, $$N = \frac{\theta}{\phi} = \frac{n_e^3 r_{33} B D V_o}{\lambda A^2}. \quad (8)$$

In the foregoing equation, the $V_o$ is 30 volts, the arithmetic sum of the two 15-volt deflection voltages, which are oppositely polarized. The calculation shows N = 0.6 spots with $1/e^2$ resolution, where $e$ is the base of the natural logarithms. It may be seen that this resolution criterion is more conservative than the usual Rayleigh criterion. To obtain N = 1 the net required voltage is $V_o = 50$ volts (±25 volts).

The switching voltage just calculated can be reduced at the expense of ease of alignment of the prism deflector 11 by using diffraction-limited electrode dimensions which can be shown to yield $V_o = 20$ volts (±10 volts) for N = 1 and A = 50 μm.

The discontinuities shown in curve 36 are attributable to the anomalies introduced by the concentration of electric field at the ends of electrode 18 and at the nearby ends of electrodes 17 and 19. There is also fringing of these fields in the direction perpendicular to the plane of the light-guiding layer 13.

Bipolar switches of the type described with reference to FIG. 2 can serve as elements of larger optical switching networks analogous to electrical switching networks, for instance, those of the type described by N. T. Tsao-Wu, "Sorting and Rearrangeable Switching Networks," *IEEE Transactions on Communication Techniques*, Volume 19, page 596 (1971). For this purpose the devices of FIG. 2 could be adapted into an integrated optical network by interconnecting successive switches 11 with strip dielectric waveguides disposed to pick up the beam at the various intended resolvable spots of deflection.

It should also be observed that other simple means of contacting electrodes 27 through 29 may be feasible and that, in any event, the electrode arrangements for FIGS. 1 and 2 are completely different, simpler and easier to manufacture than the electrode arrangements of prior thin-film switching techniques. For example, this arrangement compares favorably with that shown in the article by P. K. Tien et al, "Light Beam Scanning and Deflection in Epitaxial LiNbO₃ Electrooptic Waveguides," *Applied Physics Letters*, Volume 25, page 563 (1974). It should also be understood that other metals may be diffused into LiNbO₃ to form the optical waveguide and that it may be fabricated as a strip dielectric waveguide even through the region of the deflector, providing sufficient width is available to permit the deflection to two or more output strip dielectric waveguides.

An array of M of these dual prism deflectors arranged side by side and intercepting a broad input beam will give M times as many resolvable spots for the same deflection voltage, V, applied to each. See the article by Ninomiya, *IEEE Journal of Quantum Electronics*, Vol. 9, p. 791 (1973) and Vol. 10, page 358 (1974).

I claim:

1. An optical device comprising a substrate, a light-guiding thin-film disposed on said substrate and composed of an electrooptic material oriented to have its axis for the linear electrooptical effect along a first direction parallel to the interface with said substrate, and means for providing electrooptic deflection of light propagating in said film orthogonal to said first direction, comprising three metallic electrodes in the form of stripes of the metallic material, two of said stripes being disposed essentially parallel to the path of the incoming light and the third extending essentially diagonally between, but not contacting, opposed ends of the other two stripes, said three stripes defining two substantially triangular electrooptic waveguide portions in said path.

2. An optical device according to claim 1 in which the three metallic electrodes have enlarged areas removed from the path of the light for providing external connection to said electrodes.

3. An optical device according to claim 1 in which the substrate is single crystal LiNbO₃ and the light-guiding thin-film is an extension of the same single crystal LiNbO₃ with a metal diffused therein to increase the optical refractive index.

4. An optical device according to claim 1 in which the width of the diagonally extending electrode is at least an order of magnitude smaller than the spacing between the other two electrodes.

5. An optical device according to claim 4 in which the spacing between the outer two electrodes lies in a range including about 50 μm to about 100 μm, the electrooptic material being single crystal LiNbO₃ having its crystallographic C-axis along the first direction.

6. An optical device according to claim 1 adapted to be a bipolar switch in that the separation of the outer two electrodes is of the order of twice the expected waist diameter of the light beam to be deflected, the width of the diagonally extending electrode is more than an order of magnitude less than the separation between the outer two electrodes, and the nearest approaches of the three electrodes are about an order of magnitude less than the separation of the outer two electrodes.

7. An optical device according to claim 1 in which said means for providing electrooptic deflection of light further comprises voltage source means having a first terminal connected to both of said two parallel stripes and a second terminal connected to said diagonal stripe, whereby an electric field is applied essentially parallel to said first direction.

8. An optical device according to claim 7 in which said voltage source means is of a type adapted for modulating purposes.

9. An optical device according to claim 1 in which said optical device further comprises light source means for providing said propagating light in said light-guiding thin film.

10. An optical device according to claim 1 in which said optical device further comprises utilization means located so that light can pass from said means for providing electrooptical deflection through said light-guiding thin film to said utilization means.

* * * * *